Jan. 26, 1960 J. MILESCHUK 2,922,246
FISH LURE
Filed July 21, 1958
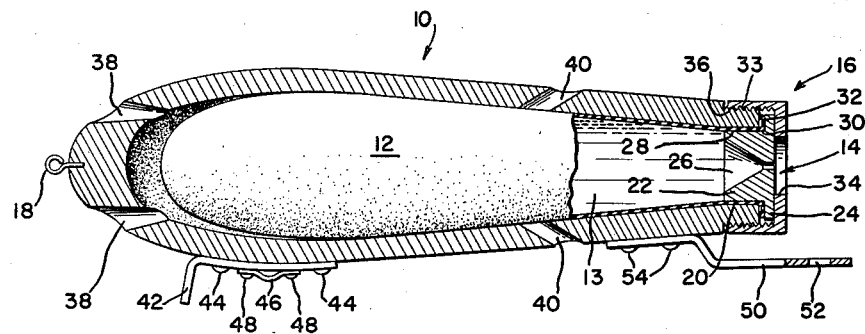
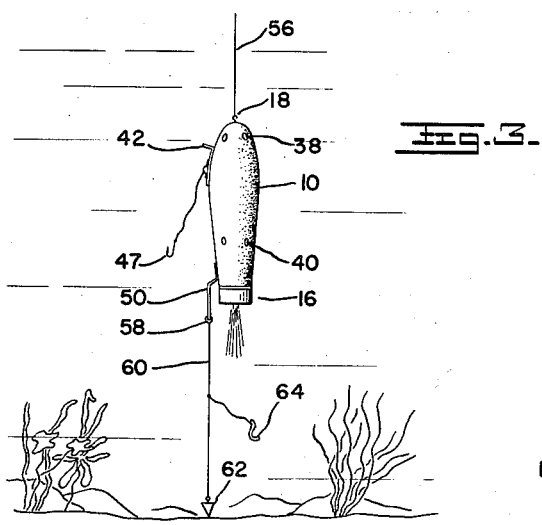
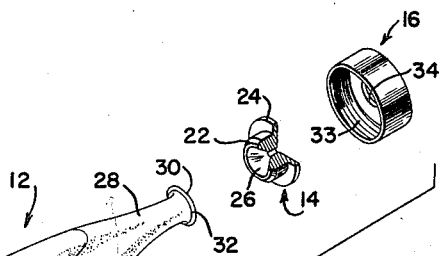
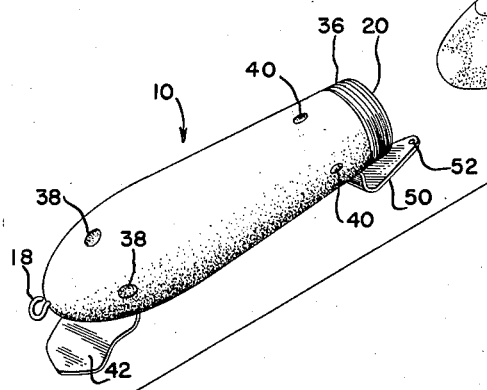
INVENTOR.
JOSEPH MILESCHUK
BY
*Shapiro and Shapiro*
ATTORNEYS

United States Patent Office 2,922,246
Patented Jan. 26, 1960

2,922,246

FISH LURE

Joseph Mileschuk, Astoria, N.Y.

Application July 21, 1958, Serial No. 749,729

5 Claims. (Cl. 43—42.06)

This invention relates to an improved fish lure, and more particularly to a fish lure of the type which exudes a liquid lure substance.

Fish lures of the type which eject a liquid lure substance or which produce a chum slick are known, such lures frequently being devised to simulate a wounded fish and thus enhance their fish-attractive properties. In general, the lures of this type which have been proposed are of relatively complex construction, requiring special and expensive parts and being incapable of manufacture by simple mass production techniques. Moreover, they are limited to a single type of fishing, such as trolling.

The fish lure of the present invention is very simple in its construction, yet is versatile and highly effective, and it is accordingly a principal object of the invention to provide such a fish lure.

Another object of the invention is to provide a fish lure which may be used in surface fishing or trolling as well as bottom fishing.

A further object of the invention is to provide a fish lure of the foregoing type which is constructed to have a wiggling or wobbling movement as it is pulled through the water.

A specific object of the invention is to provide a fish lure of the foregoing type which produces an atomized spray of liquid lure substance.

Yet another specific object of the invention is to provide a lure of the foregoing type that is constructed so as to spray live or whole bait with a coating of the liquid lure substance.

The foregoing and other objects, features, and advantages of the invention and the manner in which the same are accomplished will become more readily apparent upon consideration of the following detailed description of the invention when taken in conjunction with the accompaying drawings, which illustrate a preferred and exemplary embodiment, and wherein:

Figure 1 is a perspective exploded view illustrating the major components of the invention;

Figure 2 is a longitudinal sectional view of the invention with the parts shown assembled; and Figure 3 is a diagrammatic view illustrating the use of the invention in bottom fishing.

Referring to the drawings, the lure of the invention comprises an ovate hollow body 10, a bladder 12, and a nozzle 14, the nozzle being held in place in the body by a cap 16. The body may be formed of any suitable material but is preferably of molded plastic. One end of the body, which may be termed the front, is provided with a line attachment, which in the form shown is a ring 18 threaded into or otherwise attached to the wall of the lure body. The other end of the body has an opening 20 which is adapted to receive the neck portion 22 of the nozzle 14.

The nozzle is also preferably of molded plastic construction and has a disc-like shoulder 24 and a nozzle passage 26, the passage preferably tapering down from a relatively large opening at its inner end to a small opening at its outer end. In the form shown the cap 16 is a cup-like member having internal threads 33 and an enlarged opening 34 which is aligned with the passage of the nozzle when the cap is threaded onto the mating external threads 36 of the corresponding end of the lure body.

The bladder is preferably made of flexible resilient material such as rubber, and in the form shown is constituted by a simple toy balloon. It has a neck portion 28, and a mouth 30 surrounded by a lip 32. The bladder is elongated and is of such shape that when filled with a suitable liquid lure substance, such as fish oil, bunker oil or whole blood, it substantially conforms to the configuration of the cavity within the plug body 10.

To facilitate assembly of the foregoing parts without spilling the liquid lure substance, the empty bladder may first be inserted in the body cavity, the neck 28 being allowed to extend from the opening 20. The liquid lure may then be poured into the bladder, without entirely filling the same, and the neck 22 of the nozzle inserted in the mouth 30 of the bladder. The neck 28 of the bladder is preferably stretched somewhat in the assembly process to maintain a tight fit with the nozzle. The nozzle may then be inserted in opening 20 of the lure body along with the neck 28 of the bladder. When the bladder-nozzle unit is fully inserted, the lip 32 of the bladder will lie between the nozzle shoulder 24 and the rim of opening 20, and when cap 16 is threaded onto the lure body, the nozzle and bladder will be held firmly in place, as shown in Fig. 2.

At the front of the lure body several water inlet passages 38 are provided. These passages are approximately parallel to the axis of the body and may be arranged symmetrically. At locations between the opposite ends of the body several water outlet passages 40 are provided. These passages preferably have a rearward inclination as shown in Figure 2 and may correspond in number and position to the inlet passages.

At one side of the lure body adjacent the front an animating or action providing member 42 is attached, as by screws 44. This member preferably is in the form of an inclined vane. A hook attachment 46, which may be in the form of an eye overlying member 42, is secured to the lure body as by screws 48. A hook 47 may be be secured directly to the attachment or by means of a leader as shown in Fig. 3. Another hook attachment 50, which may be in the form of a flat arm having an eye 52, is affixed to the rear portion of the lure body as by screws 54.

When the lure of the invention is used in surface fishing or trolling, it is drawn through the water by a line attached to ring 18. The pressure of the water entering the passages 38 squeezes the bladder and forces the contained liquid out of the nozzle passage 26. Because of the small size of the nozzle opening, the liquid is ejected slowly in small quantities. The exit holes 40 permit the water to flow out of the body, thereby reducing the pressure on the bladder during normal trolling speeds and preventing excessive emission of the liquid lure substance. If the lure is jerked rapidly, however, the water pressure on the bladder increases spasmodically, producing an atomized spray of liquid lure from the nozzle.

The force exerted by the water on the vane 42 during trolling causes the lure to wiggle or wobble, creating a disturbance which attracts fish that may be distant from the lure. The animation of the lure is accompanied by the production of a chum slick by the ejected and atomized liquid, and if a suitable luring fluid is employed, the combined effect will closely simulate a wounded bait fish.

The device of the invention is also useful in bottom fishing, as shown in Figure 3. For such application the lure is suspended from a line 56, and the rear hook attachment 50 is connected to a bottom fishing rig, which may include a coupling 58, a leader 60, a weight 62, and bait 64 (preferably live). When the lure is jerked upwardly, the pressure of the water entering the passages 38 will cause the luring substance, such as oil or whole blood, to spray and coat the bait 64. The bait is thus made especially attractive to fish.

It is to be noted that regardless of the type of fishing in which the lure of the invention is employed, the production of an atomized spray is very advantageous, because the small globules of oil or other liquid lure are spread through the water, rather than rising directly to the surface as a stream of oil.

It will be apparent from the foregoing description that the invention provides an inexpensive lure employing simple elements, but one which is versatile and highly effective. It will be appreciated by those skilled in the art that while a preferred embodiment has been shown and described, changes can be made without departing from the principles and spirit of the invention, the scope of which is defined in the appended claims. Accordingly, the foregoing embodiment is to be considered illustrative, rather than restrictive of the invention, and those modifications which come within the meaning and range of equivalency of the claims are to be included therein:

The invention claimed is:

1. A fish lure comprising a hollow body having a front end and a rear end, a liquid-impervious bladder in said body mounted in the hollow portion of said body and arranged with the mouth thereof located at the rear end of the said hollow body, said body having a nozzle at the rear end thereof with a passage therethrough connecting the interior of said bladder with the exterior of said body for the ejection of a fluid from said bladder, said body having at the front end thereof a water inlet passage through its wall communicating with said hollow interior whereby the contents of said bladder are ejected through said nozzle under the pressure of water entering said inlet passage.

2. A fish lure comprising an elongated hollow body having a front end and a rear end and provided with an elongated liquid-impervious bladder therein mounted in the hollow portion of said body and adapted to contain a fish lure fluid, a nozzle at the rear end of said body with a fish lure fluid discharge passage therethrough connecting the interior of said bladder with the exterior of said body, a water inlet passage at the front end of said body communicating with said hollow interior, and a water outlet passage through the wall of said body intermediate said ends and communicating with the exterior of said body whereby water directed through said water inlet passage will act on said bladder to cause the same to discharge its contents through said outlet passage.

3. A fish lure as in claim 1 in which the said bladder is constituted by a balloon and the said nozzle is fitted into the mouth of said balloon.

4. A fish lure comprising an ovate hollow body having an opening at one end, a balloon bladder within said body and having an open mouth adjacent said opening, an atomizer nozzle having an ejection passage and a neck portion inserted through said opening into the mouth of said bladder whereby said passage connects the interior of said bladder with the exterior of said body, said nozzle having a shoulder outside said opening, said bladder having a lip surrounding said mouth and located between said shoulder and the rim of said opening, a cap overlying said shoulder and retaining said nozzle and bladder in position, the cap having an opening permitting the communicaton of said nozzle passage with the exterior of said body, the other end of said body having a line attachment and a water inlet passage through its wall, and a water outlet passage through the wall of said body between said ends.

5. The invention of claim 4, further comprising an animating vane attached to the side of said body, said body also being provided with hook attachments.

References Cited in the file of this patent

UNITED STATES PATENTS

| | | |
|---|---|---|
| 2,552,224 | Setterblade | May 8, 1951 |
| 2,666,275 | Smith | Jan. 19, 1954 |
| 2,674,058 | Lindenberg | Apr. 6, 1954 |
| 2,791,058 | Bettini | May 7, 1957 |